Figure 1:
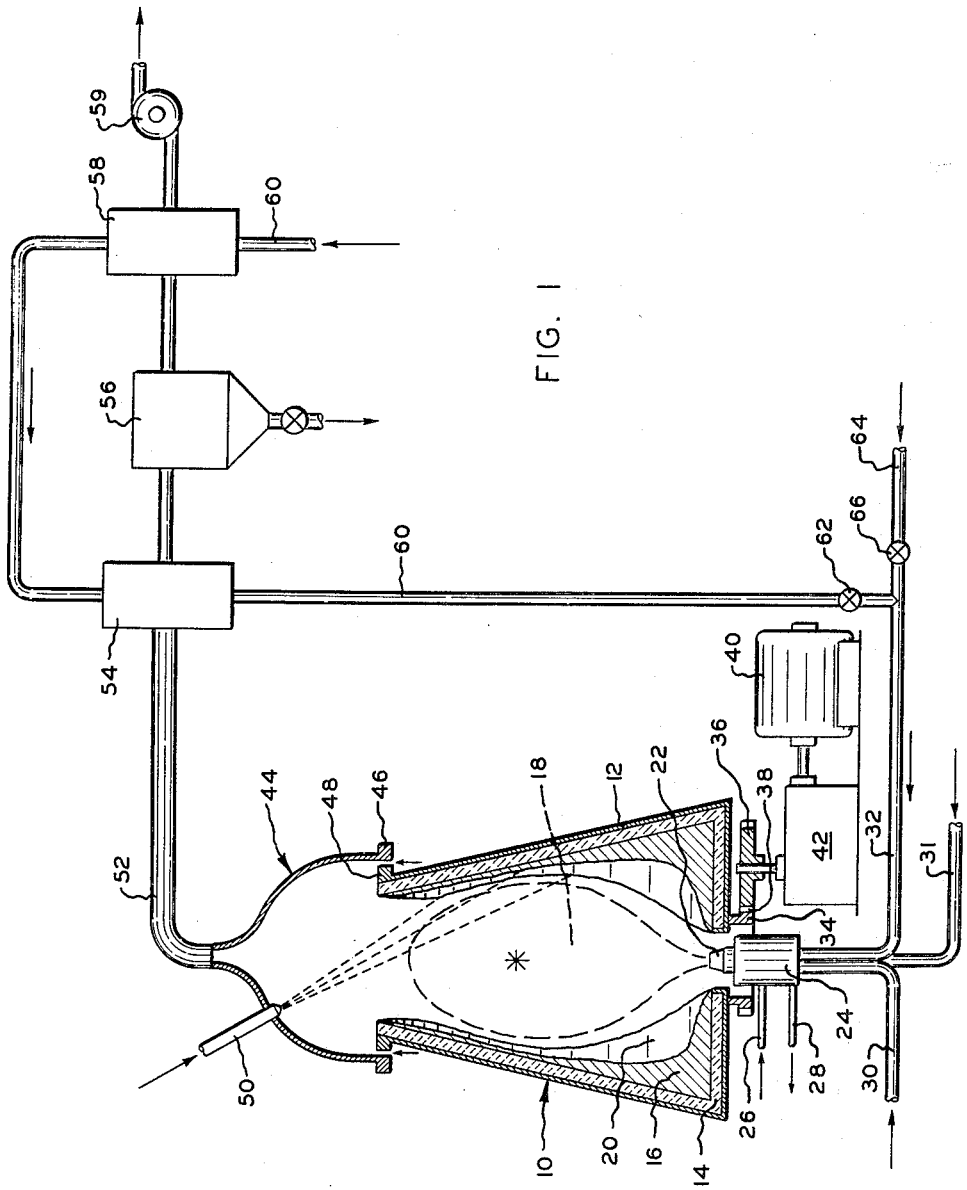

Dec. 11, 1962    R. ANTONSEN ET AL    3,068,089
PROCESS AND APPARATUS FOR THE PRODUCTION OF
FINELY-DIVIDED PIGMENTS
Filed May 20, 1959    2 Sheets-Sheet 1

INVENTORS
RANDOLPH ANTONSEN
JOHN M. BRADLEY
ROBERT D. BEATTIE
BY
ATTORNEY

Dec. 11, 1962 R. ANTONSEN ET AL 3,068,089
PROCESS AND APPARATUS FOR THE PRODUCTION OF
FINELY-DIVIDED PIGMENTS
Filed May 20, 1959 2 Sheets-Sheet 2

INVENTORS
RANDOLPH ANTONSEN
JOHN M. BRADLEY
ROBERT D. BEATTIE
BY

ATTORNEY

United States Patent Office 3,068,089
Patented Dec. 11, 1962

3,068,089
PROCESS AND APPARATUS FOR THE PRODUCTION OF FINELY-DIVIDED PIGMENTS
Randolph Antonsen, Boston, John M. Bradley, Essex, and Robert D. Beattie, Watertown, Mass., assignors to Cabot Corporation, Boston, Mass., a corporation of Delaware
Filed May 20, 1959, Ser. No. 814,540
20 Claims. (Cl. 75—0.5)

This invention relates to the production of finely-divided metallic powders. More particularly, it comprises a new and improved process for converting metals, metal alloys, and metal compounds such as ores or similar substances into the vapor state to render them, either chemically unchanged or after dissociation or reaction with other substances, suitable for further processing, such as precipitation in the form of a very fine powder. The invention includes within its scope novel apparatus in which the said process may advantageously be carried out. For the purposes of this invention, silicon is considered to be a metal.

Inherent within the conventional electric-arc furnace process for the production of finely-divided metallic powders from their naturally occurring sources or synthetic counterparts are numerous difficulties. Outstanding among these are the problem of providing a sufficiently erosion-resistant insulation against the extremely high temperatures encountered during commercial production and the problem of simultaneously obtaining uniform heating and efficient removal of the vaporous product.

It is the principal object of this invention to provide a process and apparatus for the economical production of commercial quantities of finely-divided powders.

It is another object of this invention to provide an improved process for vaporization of metals, metal compounds, metal alloys, and metal-containing minerals.

It is a further object of this invention to provide an apparatus for the conversion of solid materials from a coarse to a finely-divided pigment state.

It is a still further object of this invention to provide an erosion-resistant furnace for the production of finely-divided metals and metallic oxides from their corresponding natural or mineral forms.

Broadly, the process of this invention comprises vaporizing metals, metal alloys, metal compounds, and other mineral substances in an open-flame rotating furnace. The raw material is continuously introduced into the furnace and a combustible fluid burned therein. The raw material melts and the rapid rotation of the furnace causes the resulting molten layer thereof to adhere to the wall of the furnace by centrifugal force. Raw material is vaporized from the molten layer or from the molten product of reaction of the raw material with another substance, and the products of vaporization are removed in vapor form from the axis of the furnace. The vapor is cooled by the introduction of a cooling fluid to condense the fine solids therefrom. The cooling fluid may be an appropriate gas or mixture of gases such as air, a spray of water or other suitable liquid, steam, or a combination of any two or more thereof. The finely-divided solid is then collected by one or more ceramic cyclones, ceramic filters, or other appropriate separation means. If two or more diverse materials are vaporized at the same time, their solid products may be separately recovered by fractional condensation. Heat remaining after condensation may be recovered by one or more heat exchangers and used to preheat the fuel, oxidizer, and raw materials. The raw materials may be introduced to the furnace either in the upper or lower portions thereof, and the vaporous products removed from the opposite end. It can readily be seen that, in addition to providing a revolving protective lining, the rotating furnace will allow for convenient removal of the gaseous products from the remaining central portion thereof. Also, the use of a high-temperature flame will assure not only uniform heating and heat transfer but also combustion gases which will assist in dilution and removal of the vaporized material.

Any high flame-temperature fuel which will produce the essential vaporization temperature may be burned in the furnace. Some of those which have been found satisfactory are, in order of decreasing heat value, acetylene, hydrogen, fuel oil, and natural gas. By the use of fuels which upon burning produce the same metallic powder as that obtained from the raw material, the yield of finely-divided metallic powder may be increased. The particle size of the product may be varied by changing the composition of the oxidizing gas, direction of flow of the combustion products and the rotational speed of the furnace. The use of atomic or solar energy for the attainment of vaporization temperatures is another possibility.

Our invention will be better understood and appreciated from the following more detailed description thereof taken in connection with the accompanying drawings in which FIGURE 1 is a diagrammatic view in vertical cross section of a suitable type of rotating furnace together with related product collection equipment.

Figure 2:
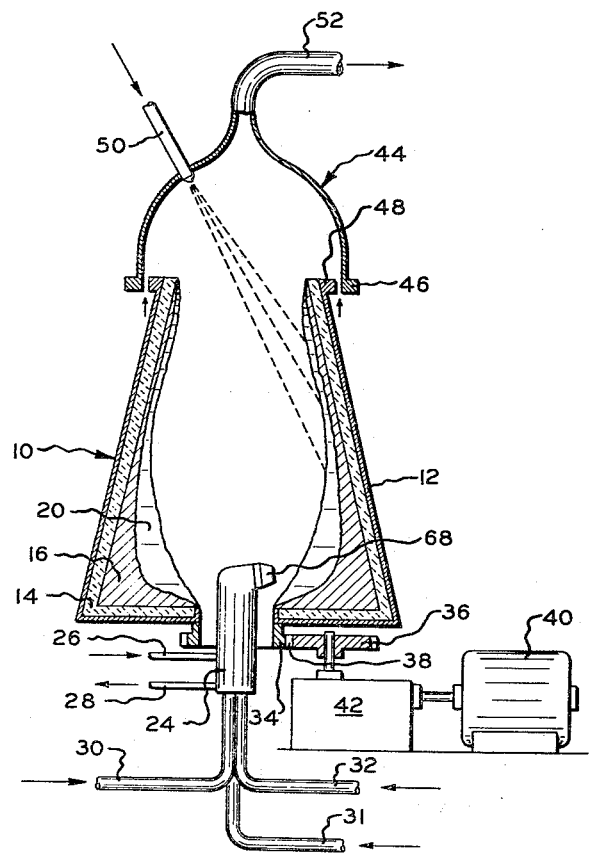

FIGURE 2 is a similar view of the rotating furnace showing a somewhat different form of burner arrangement.

Referring first to FIGURE 1, a frusto-conical rotatable furnace 10 has a wall 12 of steel or appropriate alloy lined with a suitable high-temperature resistant refractory 14. A layer of sand 16 provides additional insulation just within said refractory lining 14. Still further protection against extremely high temperatures is furnished by a layer of molten raw material 20. Burner 22, axially positioned at the bottom of burning chamber 10 in which it produces flame 18, is provided with cooling jacket 24 supplied by cooling fluid supply line 26 and fluid exhaust line 28. Oxygen-containing gas, diluent (optional), and fuel lines 30, 31, and 32 respectively enter the burner 22 vertically from beneath. Rotation means for furnace 10 consist of driving gear 36, which bears against gear 38, located adjacent burner housing 34, and connected to motor 40 through gear housing 42. Furnace 10 is capped by a hemispherical stationary dome 44 of a diameter slightly larger than the uppermost diameter of said furnace 10. Dome 44 is provided with a flange 46 at the point where it overhangs furnace 10 which is similarly provided with a flange 48. Raw material supply nozzle 50 projects into dome 44 from above and is directed toward the chamber wall. Effluent line 52 connects the top of dome 44 with separator 56, which may comprise a ceramic filter, ceramic cyclone, or both, passing through heat exchange unit 54 and then through another heat exchange unit 58, terminating at exhaust fan 59. Fuel line 60 passes through indirect heat exchange unit 58 and continues on through heat exchange unit 54 and through valve 62 to line 32. Fuel supply line 64 enters burner supply line 32 through control valve 66.

An alternative burner arrangement is illustrated in FIGURE 2. In this embodiment, the burner 68 is directed substantially radially with respect to the axis of the furnace 10, but at a slight upward angle from the horizontal and in a direction generally opposite that of rotation of the furnace. In this embodiment, the flame is thus directed more or less tangentially with respect to the circular wall of the furnace, and the gases from the burner spiral toward the dome 44 in a direction opposite the direction of rotation of the furnace.

The process is carried out as follows: A fluid fuel such as natural gas composed principally of methane is introduced to burner 22 through line 32, oxygen-containing gas (which may be pure oxygen) is introduced thereto through line 30, and a diluent such as air, preferred but not necessary, is supplied through line 31. The diluent serves also to increase the turbulence and the Reynolds number within the reactor, with the result that a higher and more economical rate of evaporation is achieved. The furnace is rotated at a suitable speed, say 100 r.p.m., while raw material is introduced through nozzle 50 in a direction such that it strikes the wall near the hottest portion of flame 18 and is held against lining 16, forming a molten layer thereagainst, somewhat thicker at the bottom than at the original point of impact and lessening to no layer at all at the top of the rotating reactor 10 due to a combination of the centrifugal force, the force of gravity, and the frusto-conical shape of the reactor. The vaporized raw material or reaction product is swept upward with the gaseous products of combustion and is condensed by cooling fluid which enters circumferentially as indicated by the arrows through the annular passage between the top of the furnace and dome 44. The finely-divided solid condensation product flows as an aersol through conduit line 52 and is separated from the effluent gases, which exhaust via fan 59, by collecting means 56. After the reactor has reached operating temperatures, valve 66 is closed and fuel is flowed through line 60, being preheated by hot effluent gases in heat exchange units 58 and 54 prior to being admitted to fuel line 32 through valve 62.

Following are specific examples of the production of metallic powders in accordance with the invention. Except where otherwise indicated, the preceding procedure is followed. These examples are given for purposes of illustration and not as a limitation of the scope of this invention. The heat available for formation of the various metal powders in the following examples is 5,250,000 B.t.u./hr. The yield of metallic powder in each case is approximately 99.9% of the theoretical yield based upon the amount of metal counterpart introduced. The pressure within the furnace is maintained at approximately atmospheric level.

*Example 1*

Coarse silica in the form of glass sand (quartz) is introduced to the heated rotating furnace through the sand-slinger nozzle at the rate of 1578 lbs./hr. The temperature within the furnace in the body of the gas is maintained at about 4140° F., and the temperature at the wall at about 3900° F. The pressure inside the furnace is kept at approximately atmospheric level. Since the melting point of silica is 2786° F., it immediately melts, forming a layer of molten material which is held against the wall by centrifugal force. Silica is vaporized continuously from this layer, its boiling point being approximately 3452° F. Finely-divided silica is condensed from the gases which leave the furnace.

*Example 2*

Finely-divided titania is produced from rutile, a mineral which consists primarily of titanium dioxide, by vaporization in the rotating furnace in the same manner as silica was vaporized in Example 1. The product is recovered at the rate of 1764 lbs./hr. The melting point of the rutile is 3317° F., and its boiling point in the neighborhood of 3632° F. There is a temperature differential between the axial gases and the wall of approximately 200 degrees, the mean wall temperature being about 3710° F., and the temperature in the body of the gas about 3910° F. The heat required of the furnace for the vaporization of rutile is approximately 2980 B.t.u./lb.

*Example 3*

1433 lbs./hr. of copper powder are produced by the vaporization of crude metallic copper in the rotating furnace. A total of 3670 B.t.u. is required to vaporize a pound of crude metallic copper, the melting point of copper being approximately 1983° F. and the boiling point approximately 3745° F.

*Example 4*

Tin is vaporized in the rotating furnace at the rate of 3820 lbs./hr. requiring a total of 1373 B.t.u./lb. to bring the elemental tin first to its melting point of approximately 450° F., then to melt it, next to bring the molten material to its vaporization temperature of about 4100° F., and finally to vaporize it. A finely-divided metallic powder formed by condensation from the gases leaving the furnace is then collected.

*Example 5*

Ilmenite is similarly vaporized, going first through the molten state. Both titanium dioxide and iron oxide vapors are formed. They are separately precipitated by fractional condensation from the gases leaving the rotating furnace.

*Example 6*

An insulating layer of molten bauxite is formed in the rotating furnace. Iron oxide and aluminum oxide are vaporized therefrom and fractionally condensed from the effluent gases.

The remaining metal and metalloid oxides from group IV of the Mendelyeev Periodic Table, aluminum oxide, and mixtures of said oxides may likewise be converted by the process and apparatus of this invention from their coarse or naturally occurring forms to their finely-divided forms.

The metallic oxides produced by the process and apparatus of this invention generally have a surface area ranging from about 50 to 250 m.²/gm. The upper limit of particle size is approximately 0.05 micron. The powdered metallic powders are useful in the electric, automotive, machinery, tool, and refractory-metal industries, as metallic paint and ink pigments, for general-purpose reinforcing fillers, flares and incendiary bombs, and as catalysts.

It will be apparent to anyone skilled in the art that numerous other metals, metal compounds, alloys and other mineral substances may be converted in the rotating furnace of this invention from the solid to the vaporous form and the corresponding finely-divided metallic powders condensed therefrom. Also, many modifications and additions to the process and apparatus of this invention as illustrated by the drawings are possible. For example, the shape of the furnace, location of the flame and method of introducing the raw material may be varied.

A feature of this invention is the centrifugal formation in the rotating furnace of an insulating layer of molten material. This not only adds to uniformity of vaporization but also leaves a convenient central channel for ready removal of all gases formed. Another feature is the sweeping of the vaporization products away from the heating zone to the cooling area by gaseous products of combustion. Still another feature is the versatility of the process. Thus, by varying the amount of diluent used in the gases burned, the speed of rotation of the furnace and the direction of flow of the combustion products, the composition of the combustion components of the exhaust gas may be controlled in such a manner as to vary the particle size of the finely-divided metallic powder produced over a broad range, yet not beyond the pigment utility size.

Having thus described our invention, we claim:

1. A process for the production of finely divided solid materials which comprises the steps of introducing a mixture of a combustible fuel and an oxygen-containing gas centrally into one end of a heat insulated, rotatable furnace, introducing a material selected from the group consisting of metal-containing materials, metalloid-containing materials and mixtures thereof thereinto, burning the said fuel mixture, melting said material, rotating the furnace at a speed sufficient to maintain a substantially continuous uninterrupted layer of said melted material by centrifugal force on the inner walls of said furnace, vaporizing the said melted material, conducting the resulting vapors from the end of the furnace opposite that at which said fuel and gas is introduced by means of the sweeping action of the combustion product gases, condensing the so-conducted vapors to solid product in finely divided form, and recovering said solid product from the gases.

2. The process of claim 1 in which additional of the said material introduced to said rotating furnace is delivered directly to the hottest portion of said furnace.

3. The process of claim 1 further characterized by passing the fuel mixture in heat exchange relation with the said conducted vapors and combustion product gases, said heat exchange relation occurring at a time after said vapors and combustion product gases have left the combustion zone and prior to the time said fuel mixture is introduced to the combustion zone.

4. The process of claim 1 in which the centrally introduced mixture of a combustible fuel and an oxygen-containing gas is directed substantially tangentially to the periphery of the furnace in a direction opposite that of rotation of the furnace.

5. The process of claim 1 in which the combustible fuel is methane and the oxygen-containing gas pure oxygen.

6. The process of claim 1 in which the said material introduced into the rotatable furnace is predominately in the oxide form.

7. The process of claim 1 in which the material introduced into the rotatable furnace is glass sand.

8. The process of claim 1 in which the material introduced into the rotatable furnace is rutile.

9. The process of claim 1 in which the material introduced into the rotatable furnace is copper.

10. The process of claim 1 in which the material introduced into the rotatable furnace is tin.

11. The process of claim 1 in which the material introduced into the rotatable furnace is bauxite.

12. The process of claim 1 in which the material introduced into the rotatable furnace is ilmenite.

13. The process of claim 1 in which the vapors are condensed by the introduction of cooling fluid.

14. Apparatus for converting solids from one solid form to another which comprises, in combination, a refractory-lined rotatable furnace, means for rotating said furnace at a speed sufficient to distribute the material therein about the inner walls thereof by centrifugal force, means for introducing a high flame-temperature fuel and an oxygen-containing gas thereinto and burning same; said means comprising an axially positioned burner at one end of said furnace adapted to direct the flame centrally to the rotatable furnace, means for discharging vaporous material therefrom, quench-cooling means, and aerosol separation means.

15. The apparatus of claim 14 wherein the means for introducing a high flame-temperature fuel and an oxygen-containing gas and burning same consists of an axially-located burner positioned at one end of the furnace and adapted to direct the flame substantially tangentially to the wall of the furnace in a direction generally opposite the direction of rotation of said furnace.

16. Apparatus for producing finely-divided solid materials which comprises a refractory-lined rotatable furnace which rotates about an approximately vertical axis, means for introducing solid raw material thereinto, means for rotating said furnace at a speed sufficient to distribute the material therein about the inner walls thereof by centrifugal force, means for supplying a combustible fluid fuel mixture to said furnace; said means comprising an axially-positioned burner at the lower end of said furnace adapted to direct the flame centrally into the rotatable furnace, means for removing the gases formed therein from said furnace, means for condensing the finely-divided solid materials from said gases, and means for recovering the solid materials.

17. The apparatus of claim 16 wherein the said refractory lined rotatable furnace is frustoconical wherein the frustoconical shape is generally upright.

18. The apparatus of claim 16 wherein the means for introducing solid raw material comprise a nozzle directed from above toward the inner wall of said furnace.

19. The apparatus of claim 16 wherein the furnace is capped with a stationary hemispherical-shaped dome of larger diameter than that of the upper end of said furnace to provide an annular opening between the overhanging inner wall of said dome and the outer wall of said furnace.

20. The apparatus of claim 16, where the means for introducing a high flame temperature fuel and an oxygen-containing gas and burning same comprises an axially-located burner positioned at one end of the furnace and adapted to direct the flame substantially tangentially to the wall of the furnace generally opposite the direction of rotation of said furnace.

References Cited in the file of this patent

UNITED STATES PATENTS

| | | |
|---|---|---|
| 959,924 | Dedolph | May 31, 1910 |
| 970,705 | Hageman | Sept. 20, 1910 |
| 1,014,062 | Hughes | Jan. 9, 1912 |
| 1,161,885 | Rigg | Nov. 30, 1915 |
| 1,441,351 | Hindshaw | Jan. 9, 1923 |
| 1,513,280 | Schmidt | Oct. 28, 1924 |
| 1,566,103 | Kirk | Dec. 15, 1925 |
| 1,754,169 | Johannsen | Apr. 8, 1930 |
| 1,755,712 | Stephani | Apr. 22, 1930 |
| 1,943,601 | Hansgirg | Jan. 16, 1934 |
| 2,207,746 | Maier | July 16, 1940 |
| 2,866,703 | Goss | Dec. 30, 1958 |
| 2,878,004 | Saeman | Mar. 17, 1959 |